United States Patent
Blewett et al.

(10) Patent No.: US 9,051,878 B2
(45) Date of Patent: Jun. 9, 2015

(54) ENGINE BEARING COMPARTMENT

(75) Inventors: Michael R. Blewett, Stillman Valley, IL (US); Adrian L. Stoicescu, Rockford, IL (US); Jeff A. Brown, Cherry Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1022 days.

(21) Appl. No.: 13/166,509

(22) Filed: Jun. 22, 2011

(65) Prior Publication Data

US 2012/0328417 A1 Dec. 27, 2012

(51) Int. Cl.
F01D 25/16 (2006.01)
F02C 7/06 (2006.01)
F01D 25/18 (2006.01)

(52) U.S. Cl.
CPC .. *F02C 7/06* (2013.01); *F01D 25/18* (2013.01)

(58) Field of Classification Search
CPC .................................. F01D 25/18; F02C 7/06
USPC ......... 184/6.11; 384/397, 462, 467–468, 470, 384/472–473, 476, 535, 538, 581, 584, 384/606; 415/111, 21.3, 232
See application file for complete search history.

(56) References Cited

U.S. PATENT DOCUMENTS

| 2,604,188 | A | * | 7/1952 | Marchant ...................... 184/6.11 |
| 3,057,542 | A | * | 10/1962 | Keenan et al. ................. 415/180 |
| 4,265,165 | A | | 5/1981 | Engel et al. |
| 6,516,618 | B1 | | 2/2003 | Bock |
| 7,334,982 | B2 | * | 2/2008 | Singh et al. .................... 415/111 |
| 7,364,117 | B2 | | 4/2008 | Dionne |
| 7,373,780 | B2 | | 5/2008 | Peters et al. |
| 7,410,341 | B2 | | 8/2008 | Gockel et al. |
| 7,571,596 | B2 | | 8/2009 | Parsons |
| 7,625,126 | B2 | | 12/2009 | Peters et al. |
| 7,811,001 | B2 | | 10/2010 | Swainson |
| 7,905,325 | B1 | | 3/2011 | Wedlake et al. |
| 7,908,840 | B2 | | 3/2011 | Schwartz et al. |
| 7,930,953 | B2 | | 4/2011 | Frost |
| 7,931,124 | B2 | | 4/2011 | Glahn et al. |
| 2008/0078617 | A1 | | 4/2008 | Glahn et al. |
| 2008/0134657 | A1 | | 6/2008 | DiBenedetto et al. |
| 2008/0236951 | A1 | | 10/2008 | Alecu et al. |
| 2010/0019505 | A1 | | 1/2010 | Frost |
| 2010/0065374 | A1 | | 3/2010 | Szolomayer et al. |

FOREIGN PATENT DOCUMENTS

| EP | 0500487 B1 | 5/1995 |
| EP | 2166196 A2 | 3/2010 |

\* cited by examiner

*Primary Examiner* — Nathaniel Wiehe
*Assistant Examiner* — Woody A Lee, Jr.
(74) *Attorney, Agent, or Firm* — Cantor Colburn LLP

(57) ABSTRACT

An engine bearing compartment is provided and includes an engine casing defining a discharge pathway for a fluid to drain from the engine bearing compartment, a shaft rotatably disposed within the engine casing to define an annulus, a housing disposed within the annulus below an elevation of the discharge pathway, an impeller rotatable with the shaft and including a centrifugal element, the impeller being disposed within the annulus at least partially below the discharge pathway elevation whereby, due to impeller rotation, the centrifugal element expels the fluid through the discharge pathway from the annulus above the discharge pathway elevation and a circuit by which fluid expelled through the discharge pathway is communicated to an interior of the housing.

20 Claims, 2 Drawing Sheets

ENGINE BEARING COMPARTMENT

BACKGROUND OF THE INVENTION

Aspects of the invention are directed to an engine bearing compartment.

Bearing compartments for jet engines are typically scavenged using a dedicated element in a positive displacement oil pump. This insures that the compartment is positively scavenged of oil under all operating conditions.

In cases where the engine bearing compartment is above the gearbox, one approach has been to allow the oil in the compartment to drain by the force of gravity into the gearbox and use the gearbox scavenge element to pump the oil back to the oil tank. Such an approach would eliminate an element in the lube and scavenge pump machinery. Gravity draining large quantities of oil, however, does not lead to a positive scavenging method and is often unreliable over the full envelope of engine operation.

BRIEF DESCRIPTION OF THE INVENTION

An engine bearing compartment is provided and includes an engine casing defining a discharge pathway for fluid to drain from the engine bearing compartment, a shaft rotatably disposed within the engine casing to define an annulus, a housing disposed within the annulus below an elevation of the discharge pathway, an impeller rotatable with the shaft and including a centrifugal element, the impeller being disposed within the annulus at least partially below the discharge pathway elevation whereby, due to impeller rotation, the centrifugal element expels the fluid through the discharge pathway from the annulus above the discharge pathway elevation and a circuit by which fluid expelled through the discharge pathway is communicated to an interior of the housing.

An engine bearing compartment is provided and includes an engine casing strut defining a discharge pathway for engine oil to drain from the engine bearing compartment, a gearbox input shaft rotatably disposed within the engine casing strut to define an annulus, a gearbox housing disposed within the annulus below an elevation of the discharge pathway, an impeller connectedly rotatable with the gearbox input shaft and including a centrifugal element, the impeller being disposed within the annulus at the discharge pathway elevation whereby, due to impeller rotation, the centrifugal element is configured to expel the engine oil through the discharge pathway from the annulus above the discharge pathway elevation and a circuit by which the engine oil expelled through the discharge pathway is communicated to an interior of the gearbox housing.

An engine bearing compartment is provided and includes an engine casing strut defining a discharge pathway, a gearbox input shaft rotatably disposed within the engine casing strut to define an annulus, a gearbox housing disposed within a first region of the annulus defined below an elevation of the discharge pathway, an impeller connectedly rotatable with the gearbox input shaft and including a centrifugal element, the impeller being disposed within a second region of the annulus defined at the discharge pathway elevation whereby, due to impeller rotation, the centrifugal element is configured to cause engine oil to be expelled in a radial direction defined with respect to an axis of rotation of the gearbox input shaft through the discharge pathway from a third region of the annulus defined above the discharge pathway elevation and a circuit fluidly coupled to the discharge pathway and an interior of the gearbox housing by which the engine oil expelled through the discharge pathway is communicated to the gearbox housing interior.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
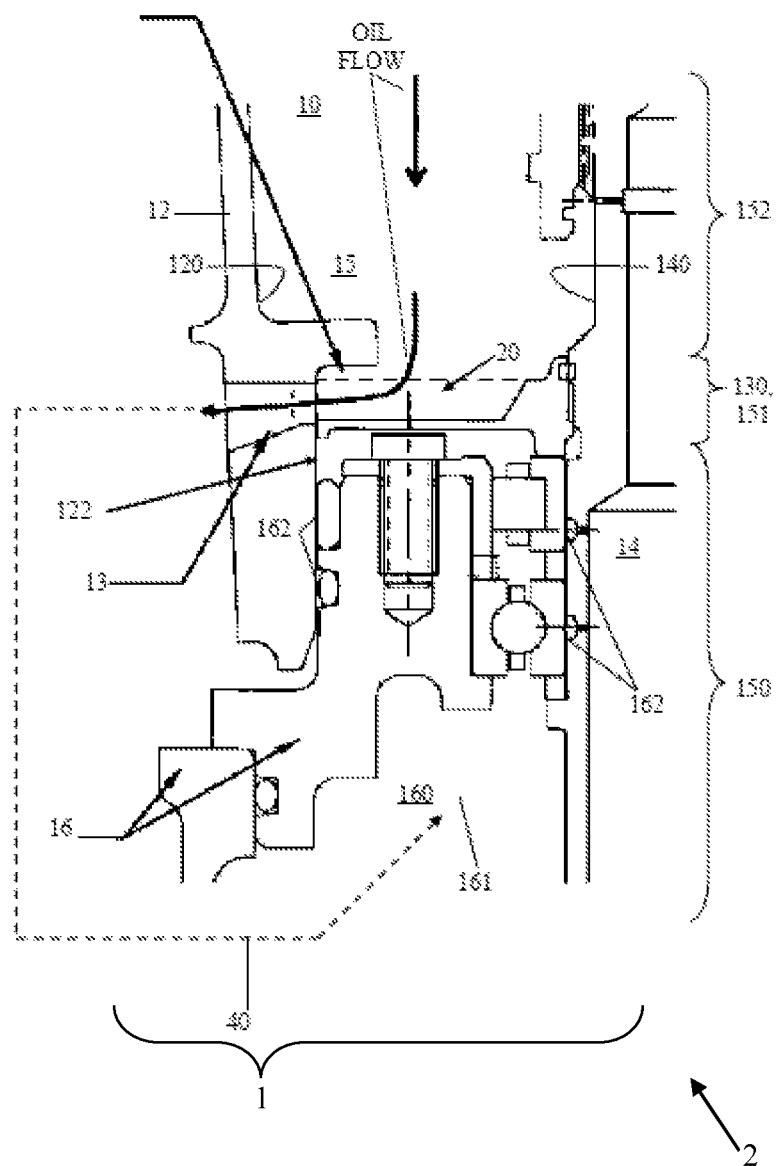
FIG. 1 is a schematic side view of an engine casing, an engine casing strut and driveline components rotatably connecting the engine to the accessory gearbox.
Figure 2:
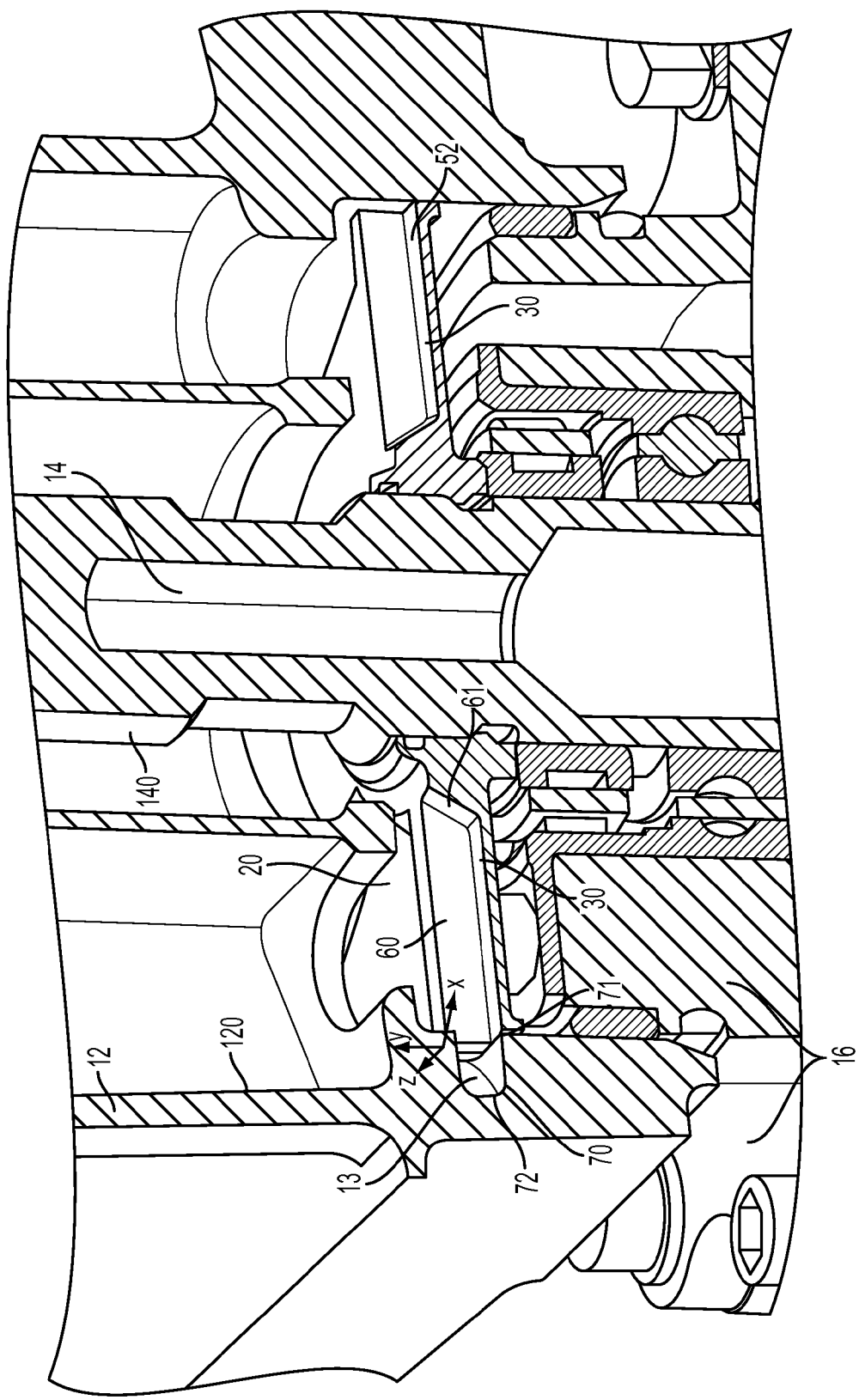
FIG. 2 is a perspective view of components depicted schematically in FIG. 1.

With reference to FIGS. 1 and 2, an engine casing strut 12 is provided within an engine case 1 of an engine bearing compartment 2. The engine casing strut 12 defines a generally annular internal passage 10 having a longitudinal axis that extends substantially vertically through a given gravitational field. The engine casing strut 12 is also formed to define a discharge pathway 13 extending at least partially perpendicularly with respect to the longitudinal axis of the internal passage 10. The engine casing strut 12 further includes a pilot 122 used to structurally attach an accessory gearbox housing 16 to the engine casing strut 12. At least partially within the gearbox housing 16 is a gearbox input shaft (hereinafter referred to as the "shaft") 14 supported by rolling element bearings 162. The shaft 14 is therefore rotatably disposed within the engine casing strut 12 to define an annulus 15 between an inner surface 120 of the engine casing strut 12 and an exterior surface 140 of the shaft 14. The discharge pathway 13 can be oriented radially with respect to an axis of rotation of the shaft 14. The gearbox housing 16 is disposed within a first region 150 of the annulus 15, which is generally defined below or partially below an elevation 130 of the discharge pathway 13, and is formed to define an interior 160 therein in which a gearbox oil sump 161 may be provided.

The internal passage 10 within the engine casing strut 12 further includes an impeller 20 and a circuit 40. The impeller 20 is connected to and rotatable with the shaft 14 and includes one or more centrifugal elements 30. The impeller 20 is disposed above the gearbox housing 16 and within a second region 151 of the annulus 15, which is generally defined at the discharge pathway elevation 130. Due to rotation of the impeller 20 and a shape of the centrifugal elements 30, which will be described below, the centrifugal elements 30 expel, for example, engine oil, in a radial direction defined with respect to an axis of rotation of the shaft 14 through the discharge pathway 13. The impeller 20 thus acts as a centrifugal scavenging element to remove engine oil draining through the engine casing strut 12.

The exemplary engine oil originates from a third region 152 of the annulus 15, which is defined above the discharge pathway elevation 130, and travels downwardly toward the impeller 20 through the internal passage 10 by the force of gravity. In addition to the exemplary engine oil, the centrifugal element 30 may expel any fluid through the discharge pathway 13 from the annulus 15. Such additional fluids include gaseous fluids that may be present within the internal passage 10. For the purposes of clarity and brevity, only the non-limiting example of engine oil will be discussed further herein.

The circuit 40 is fluidly coupled to the discharge pathway 13 and to the interior 160 of the gearbox housing 16. As such, the circuit 40 is configured such that the engine oil that is expelled through the discharge pathway 13 may be communicated to the interior 160 of the gearbox housing 16 or to any other suitable collection area within the engine lubrication system. In particular, the circuit 40 may be configured to communicate the engine oil to the gearbox oil sump 161.

The impeller 20 includes the centrifugal elements 30, which may be configured to extend radially from the impeller hub 61. The embodiment illustrated in FIG. 2 contains a lower shroud 52 which, in combination with the centrifugal elements 30, forms a recess 60 as a rotating flow passage leading from the internal passage 10 to the discharge pathway 13. It should be understood that other embodiments may include upper and lower shrouds to form the rotating flow passage and that the centrifugal elements 30 may be formed as structural features protruding from the impeller 20. In accordance with further embodiments, the plurality of centrifugal elements 30 may be defined as a circumferential array about the shaft 14 with substantially uniform or non-uniform separation between adjacent individual centrifugal elements 30 and, in still other embodiments, for example, the centrifugal elements 30 may be angled, curved or spiraled depending on specific performance requirements of the scavenging system.

As also shown in FIG. 2, the discharge pathway 13 may be formed with a funnel-shape 70 having an inlet 71 of a first size, which may be circumferentially larger or even substantially circumferentially larger than a complementary size of the recess 60, and an outlet 72 of a second size that may be smaller than the first size. As such, the engine oil expelled radially outwardly by the centrifugal element 30 may be captured by the discharge pathway 13 at the inlet 71 and funneled toward the outlet 72 and the circuit 40. In other embodiments, the discharge pathway 13 may be plural in number and may be arranged circumferentially around the impeller 20. Other embodiments may also utilize area progressions from inlet 71 to outlet 72, which differ from that depicted in FIG. 2 but that still perform the function of collecting flow being discharged from the impeller 20 to the circuit 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An engine bearing compartment, comprising:
an engine casing defining a discharge pathway for a fluid to drain from the engine bearing compartment,
the discharge pathway having an elevation length extending between upper and lower edges thereof along a longitudinal axis of the engine casing;
a shaft rotatably disposed within the engine casing to define an annulus;
a housing disposed within the annulus at least partially below the elevation length of the discharge pathway;
an impeller rotatable with the shaft and including a centrifugal element, the impeller being disposed radially inwardly from the discharge pathway within the annulus such that upper and lower edges of the impeller positionally correspond to the upper and lower edges of the discharge pathway, respectively, whereby, due to impeller rotation, the centrifugal element expels the fluid through the discharge pathway from the annulus above the lower edge of the discharge pathway; and
a circuit by which fluid expelled through the discharge pathway is communicated to an interior of the housing.

2. The engine bearing compartment according to claim 1, wherein the engine casing comprises an engine casing strut and the fluid expelled through the discharge pathway comprises engine oil.

3. The engine bearing compartment according to claim 1, wherein the discharge pathway includes a fluid passage that is oriented radially with respect to an axis of rotation of the shaft.

4. The engine bearing compartment according to claim 1, wherein the annulus is defined between an inner surface of the engine casing and an exterior surface of the shaft.

5. The engine bearing compartment according to claim 4, wherein the housing is attached to the inner surface of the engine casing and the exterior surface of the shaft.

6. The engine bearing compartment according to claim 1, wherein the housing is formed to define a gearbox sump in the interior thereof.

7. The engine bearing compartment according to claim 1, wherein the impeller has a recess defining the centrifugal element.

8. The engine bearing compartment according to claim 7, wherein the centrifugal element is oriented radially with respect to an axis of rotation of the shaft.

9. The engine bearing compartment according to claim 7, wherein the centrifugal element is one of a plurality of centrifugal elements arranged in a circumferential array.

10. The engine bearing compartment according to claim 7, wherein the discharge pathway is formed with a funnel-shape having an inlet of a first size that is circumferentially larger than a complementary size of the recess, and an outlet of a second size that is smaller than the first size.

11. An engine bearing compartment, comprising:
an engine casing strut defining a discharge pathway for engine oil to drain from the engine bearing compartment,
the discharge pathway having an elevation length extending between upper and lower edges thereof along a longitudinal axis of the engine casing strut;
a gearbox input shaft rotatably disposed within the engine casing strut to define an annulus;
a gearbox housing disposed within the annulus below the elevation length of the discharge pathway;
an impeller connectedly rotatable with the gearbox input shaft and including a centrifugal element, the impeller being disposed radially inwardly from the discharge pathway within the annulus such that upper and lower edges of the impeller positionally correspond to the upper and lower edges of the discharge pathway, respectively, whereby, due to impeller rotation, the centrifugal element is configured to expel the engine oil through the discharge pathway from the annulus above the lower edge of the discharge pathway; and a circuit by which the engine oil expelled through the discharge pathway is communicated to an interior of the gearbox housing.

12. The bearing engine compartment according to claim 11, wherein the discharge pathway includes a fluid passage that is oriented radially with respect to an axis of rotation of the gearbox input shaft.

13. The engine bearing compartment according to claim 11, wherein the annulus is defined between an inner surface of the engine casing strut and an exterior surface of the gearbox input shaft.

14. The engine bearing compartment according to claim 13, wherein the housing is attached to the inner surface of the engine casing strut and the exterior surface of the gearbox input shaft.

15. The engine bearing compartment according to claim 11, wherein the housing is formed to define a gearbox sump in the interior thereof.

16. The engine bearing compartment according to claim 11, wherein the impeller has a recess defining the centrifugal element.

17. The engine bearing compartment according to claim 16, wherein the centrifugal element is oriented radially with respect to an axis of rotation of the gearbox input shaft.

18. The engine bearing compartment according to claim 16, wherein the centrifugal element is one of a plurality of centrifugal elements arranged in a circumferential array.

19. The engine bearing compartment according to claim 16, wherein the discharge pathway is formed with a funnel-shape having an inlet of a first size that is circumferentially larger than a complementary size of the recess, and an outlet of a second size that is smaller than the first size.

20. An engine bearing compartment, comprising:
an engine casing strut defining a discharge pathway having an elevation length extending between upper and lower edges thereof along a longitudinal axis of the engine casing strut;
a gearbox input shaft rotatably disposed within the engine casing strut to define an annulus;
a gearbox housing disposed within a first region of the annulus defined below the elevation length of the discharge pathway;
an impeller connectedly rotatable with the gearbox input shaft and including a centrifugal element, the impeller being disposed radially inwardly from the discharge pathway within a second region of the annulus such that upper and lower edges of the impeller positionally correspond to the upper and lower edges of the discharge pathway, respectively, whereby, due to impeller rotation, the centrifugal element is configured to cause engine oil to be expelled in a radial direction defined with respect to an axis of rotation of the gearbox input shaft through the discharge pathway from a third region of the annulus defined above the lower edge of the discharge pathway; and
a circuit fluidly coupled to the discharge pathway and an interior of the gearbox housing by which the engine oil expelled through the discharge pathway is communicated to the gearbox housing interior.

\* \* \* \* \*